United States Patent
Deisher

(10) Patent No.: US 9,467,850 B2
(45) Date of Patent: Oct. 11, 2016

(54) HANDHELD DEVICE ASSOCIATION VIA SHARED VIBRATION

(75) Inventor: Michael E. Deisher, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1377 days.

(21) Appl. No.: 11/967,894

(22) Filed: Dec. 31, 2007

(65) Prior Publication Data

US 2009/0169018 A1 Jul. 2, 2009

(51) Int. Cl.
  *G06F 15/16* (2006.01)
  *H04W 12/06* (2009.01)
  *H04L 29/06* (2006.01)
  *H04L 9/08* (2006.01)

(52) U.S. Cl.
  CPC ............ *H04W 12/06* (2013.01); *H04L 9/0838* (2013.01); *H04L 63/0869* (2013.01); *H04L 2209/805* (2013.01)

(58) Field of Classification Search
  CPC ............. H04W 12/06; H04L 63/0869; H04L 2209/805; H04L 9/0838
  See application file for complete search history.

(56) References Cited

U.S. PATENT DOCUMENTS

| | | | | |
|---|---|---|---|---|
| 5,131,038 | A * | 7/1992 | Puhl et al. ................. | 340/5.61 |
| 5,469,727 | A * | 11/1995 | Spahn et al. ................ | 70/278.3 |
| 6,400,270 | B1 * | 6/2002 | Person ....................... | 340/568.7 |
| 6,411,195 | B1 * | 6/2002 | Goldman ..................... | 340/5.1 |
| 6,886,095 | B1 * | 4/2005 | Hind .................. | H04L 63/0823 713/168 |
| 7,128,274 | B2 * | 10/2006 | Kelley et al. ............... | 235/492 |
| 7,636,794 | B2 * | 12/2009 | Ramos et al. ............... | 709/248 |
| 7,788,500 | B2 * | 8/2010 | Okamura et al. ............. | 713/186 |
| 7,907,901 | B1 * | 3/2011 | Kahn et al. .................. | 455/41.2 |
| 8,048,174 | B2 * | 11/2011 | Yamamichi et al. ........... | 726/35 |
| 8,719,952 | B1 * | 5/2014 | Damm-Goossens . | H04L 9/0825 380/285 |
| 2002/0142764 | A1 * | 10/2002 | Newell et al. ................ | 455/419 |
| 2002/0164973 | A1 * | 11/2002 | Janik ..................... | G11B 27/10 455/403 |
| 2004/0116074 | A1 * | 6/2004 | Fujii et al. ................... | 455/41.2 |
| 2004/0167984 | A1 * | 8/2004 | Herrmann ..................... | 709/229 |
| 2004/0243351 | A1 * | 12/2004 | Calkins et al. ............... | 702/185 |
| 2005/0043997 | A1 * | 2/2005 | Sahota et al. ................. | 705/16 |

(Continued)

OTHER PUBLICATIONS

Diffie-Helmen Key Exchange Protocol; Dec. 5, 2011; Wikipedia; 10 Pages.*

(Continued)

*Primary Examiner* — Krista Zele
*Assistant Examiner* — Anthony Fabbri
(74) *Attorney, Agent, or Firm* — International IP Law Group, P.L.L.C.

(57) ABSTRACT

In some embodiments an accelerometer is mechanically coupled to a first device. The accelerometer obtains a vibration profile in response to a relative movement of the first device and a second device. A radio transmits an encrypted version of the vibration profile to the second device and receives an encrypted version of a vibration profile from the second device. A processor sets up a secure channel between the radio and the second device in which to exchange keys with the second device in order to decrypt the received encrypted vibration profile. The processor also decrypts the received encrypted vibration profile in response to at least one of the exchanged keys, compares the transmitted vibration profile with the received vibration profile and allows a sharing of resources with the second device if a match occurs between the transmitted vibration profile and the received vibration profile. Other embodiments are described and claimed.

20 Claims, 2 Drawing Sheets

(56) References Cited

U.S. PATENT DOCUMENTS

| | | | |
|---|---|---|---|
| 2005/0093868 A1* | 5/2005 | Hinckley | 345/502 |
| 2005/0125669 A1* | 6/2005 | Stewart et al. | 713/171 |
| 2005/0132227 A1* | 6/2005 | Reasor et al. | 713/201 |
| 2006/0161992 A1* | 7/2006 | Kempf | 726/34 |
| 2006/0166740 A1* | 7/2006 | Sufuentes | 463/40 |
| 2006/0174121 A1* | 8/2006 | Omae et al. | 713/172 |
| 2006/0183381 A1* | 8/2006 | Lanni | 439/677 |
| 2006/0195695 A1* | 8/2006 | Keys | H04L 9/12 713/169 |
| 2006/0282649 A1* | 12/2006 | Malamud | H04L 63/0861 712/26 |
| 2006/0287004 A1* | 12/2006 | Fuqua | 455/558 |
| 2007/0124503 A1* | 5/2007 | Ramos | G06F 3/017 709/248 |
| 2007/0213045 A1* | 9/2007 | Hermansson et al. | 455/425 |
| 2007/0218837 A1* | 9/2007 | Lessing et al. | 455/41.2 |
| 2007/0249286 A1* | 10/2007 | Ma | G06F 19/327 455/41.3 |
| 2008/0113619 A1* | 5/2008 | Torrance et al. | 455/41.2 |
| 2008/0128505 A1* | 6/2008 | Challa et al. | 235/462.13 |
| 2008/0191015 A1* | 8/2008 | Matsuo et al. | 235/439 |
| 2008/0205762 A1* | 8/2008 | Lapstun et al. | 382/187 |
| 2008/0214233 A1* | 9/2008 | Wilson | H04M 1/7253 455/556.1 |
| 2008/0244752 A1* | 10/2008 | Gudan et al. | 726/27 |
| 2008/0268882 A1* | 10/2008 | Moloney | H04L 51/18 455/466 |
| 2009/0082834 A1* | 3/2009 | Kalpin et al. | 607/60 |
| 2009/0133499 A1* | 5/2009 | Cato | 73/514.16 |
| 2009/0167487 A1* | 7/2009 | Shah et al. | 340/5.2 |
| 2009/0169018 A1* | 7/2009 | Deisher | 380/278 |
| 2009/0171616 A1* | 7/2009 | Zhang et al. | 702/141 |
| 2011/0126009 A1* | 5/2011 | Camp et al. | 713/168 |
| 2011/0191823 A1* | 8/2011 | Huibers | H04W 4/00 726/3 |
| 2013/0272520 A1* | 10/2013 | Noda et al. | 380/44 |
| 2014/0115058 A1* | 4/2014 | Yin et al. | 709/204 |

OTHER PUBLICATIONS

Rene Mayrhofer and Hans Gellersen; Shake Well Before Use: Authentication Based on Accelerometer Data 2007; Lancaster University, Computing Department, South Drive, Lancaster; Pervasive 2007, LNCS 4480, pp. 144-161.*

Daniel Bichler et al.; Key Generation Based on Acceleration Data of Shaking Processes; 2007; UbiComp 2007, LNCS 4717, pp. 304-317.*

Lars Erik Holmquist et al.; Smart-Its Friends: A Technique for Users to Easily Establish Connections between Smart Artefacts; 6 Pages.*

Alex Varshaysky et al.; Amigo: Proximity-Based Authentication of Mobile Devices; 2007; UbiComp 2007, LNCS 4717, pp. 253-270.*

* cited by examiner

HANDHELD DEVICE ASSOCIATION VIA SHARED VIBRATION

TECHNICAL FIELD

The inventions generally relate to handheld device association via shared vibration.

BACKGROUND

Many new handheld devices have become available, including laptops, smartphones, PDAs, etc. Different methods have previously been used to communicate between a handheld (portable) device and other devices. For example, Bluetooth technology has previously been used. However, methods of secure device association such as those used in Bluetooth are subject to spoofing. Therefore, a need has arisen for communication between devices so that devices can securely and uniquely identify one another, for example, to share resources in a manner that is secure but does not add increased complexity, cost, space, and/or power, etc.

BRIEF DESCRIPTION OF THE DRAWINGS

The inventions will be understood more fully from the detailed description given below and from the accompanying drawings of some embodiments of the inventions which, however, should not be taken to limit the inventions to the specific embodiments described, but are for explanation and understanding only.

DETAILED DESCRIPTION

Figure 1:
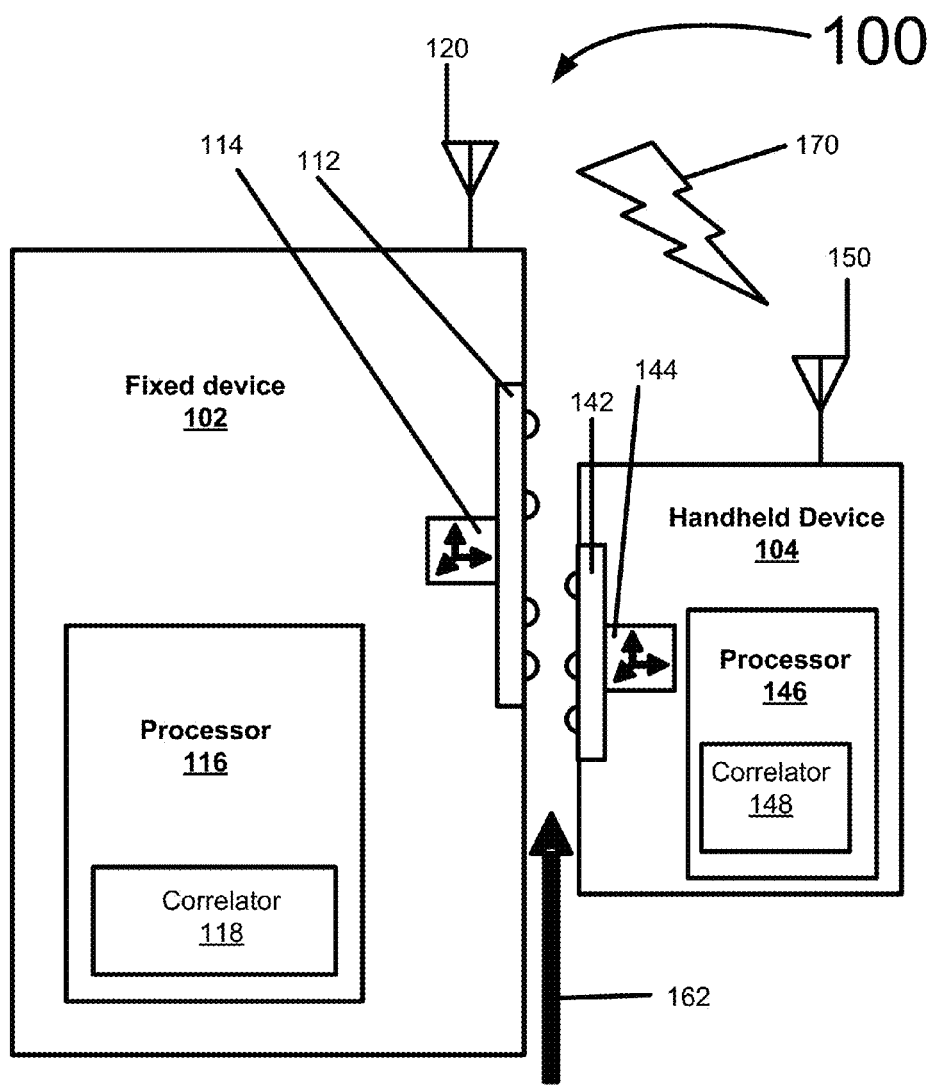
FIG. 1 illustrates a system according to some embodiments of the inventions.

Some embodiments of the inventions relate to handheld device association via shared vibration.

In some embodiments a device containing an accelerometer obtains a vibration profile as a result of mechanical coupling with the relative movement of an external device near the accelerometer. A radio transmits an encrypted version of the vibration profile to the external device and receives an encrypted vibration profile from the external device. A secure channel is then established for the exchange of keys needed to access the vibration profiles. A processor compares the transmitted vibration profile with the received vibration profile and allows a sharing of resources with the external device if a match occurs between the transmitted vibration profile and the received vibration profile.

In some embodiments a vibration profile is obtained as a result of mechanical coupling with the relative movement of an external device, an encrypted version of the vibration profile is transmitted to the external device, and an encrypted vibration profile is received from the external device. A secure channel is then established for the exchange of keys needed to access the vibration profiles. The transmitted vibration profile is compared with the received vibration profile, and a sharing of resources with the external device is allowed if a match occurs between the transmitted vibration profile and the received vibration profile.

In some embodiments a system includes a first device and a second device. The first device includes a first accelerometer to obtain a first vibration profile as a result of a mechanical coupling with the relative movement of the second device near the first accelerometer, a first radio to transmit an encrypted version of the first vibration profile to the second device and to receive an encrypted version of a second vibration profile from the second device, and a first processor to establish a secure channel for the exchange of keys needed to access the vibration profiles, to compare the transmitted first vibration profile with the received second vibration profile, and to allow a sharing of resources with the second device if a match occurs between the transmitted first vibration profile and the received second vibration profile. The second device includes a second accelerometer to obtain the second vibration profile as a result of a mechanical coupling with the relative movement of the first device near the second accelerometer, a second radio to transmit the encrypted version of the second vibration profile to the first device and to receive the encrypted version of the first vibration profile from the first device, and a second processor to establish the secure channel for the exchange of keys needed to access the vibration profiles, to compare the transmitted second vibration profile with the received first vibration profile, and to allow a sharing of resources with the first device if a match occurs between the transmitted second vibration profile and the received first vibration profile.

In some embodiments one device is securely and uniquely identified to another, for example, for the purpose of sharing resources. The two devices may be, for example, a handheld computer and a monitor such as a large LCD monitor. In some embodiments near field communication technology may be used to provide a way to securely identify one device to another. Since the two devices must be in close proximity to one another, it is assumed that any attempt to intercept the exchange of a secret between the two devices could be easily observed by a user and thwarted. However, radios and antennas needed for near field communication come with increased cost, space, and power requirements. Therefore, in some embodiments, secret identification information is exchanged between the two devices without any additional radio communication. In some embodiments, low cost accelerometers may be used on both of the two devices to sense a shared vibration that is only observable by those two devices. This can provide an assurance that the device requesting access to the resource is the correct device.

FIG. 1 illustrates a system 100 according to some embodiments. In some embodiments system 100 includes a fixed device 102 (and/or stationary device) and a handheld device 104. In some embodiments fixed device 102 includes a pairing pad 112, an accelerometer 114, a processor 116 (and/or microcontroller), a correlator 118, and/or a radio 120. In some embodiments handheld device 104 includes a pairing pad 142, an accelerometer 144, a processor 146, a correlator 148, and/or a radio 150. While FIG. 1 illustrates a fixed device 102 and a handheld device 104, it is noted that in some embodiments, device 102 and/or device 104 can be any type of device (for example, two handheld devices). Additionally, in some embodiments, for example, fixed device 102 is a printer, a scanner, and/or a large LCD monitor and/or handheld device 104 is a handheld computer.

In some embodiments, fixed device 102 includes one or more low cost accelerometers 114. Accelerometer(s) 114 measures the physical and/or mechanical acceleration of an object relative to the object that it is coupled with (in some embodiments, of the pairing pad 112). In some embodiments, the accelerometer(s) 114 is/are mounted firmly to pairing pad 112. In some embodiments, pairing pad 112 is a clearly marked and fairly flat surface with irregular bumps and ridges. In some embodiments, the pairing pad 112 is outfitted with a contact surface. In some embodiments fixed device 102 further includes one or more analog to digital converters (A/D converters) that convert, for example, between an analog signal from the accelerometer(s) 114 and a digital signal to the processor 116. In some embodiments radio 120 is a Wireless Local Area Network (WLAN) radio and/or a Wireless Personal Area Network (WPAN) radio. In some embodiments, fixed device 102 includes a conventional communication protocol with public/private key exchange and a cryptographic engine (for example, implemented by processor 116). In some embodiments, fixed device 102 includes vibration comparison logic (for example, implemented by processor 116).

In some embodiments, handheld device 104 includes one or more low cost accelerometers 144. Accelerometer(s) 144 measures the physical and/or mechanical acceleration of an object relative to the object that it is coupled with (in some embodiments, of the pairing pad 142). In some embodiments, the accelerometer(s) 144 is/are mounted firmly to pairing pad 142. In some embodiments, pairing pad 142 is a clearly marked and fairly flat surface with irregular bumps and ridges. In some embodiments, the pairing pad 142 is outfitted with a contact surface. In some embodiments, handheld device 104 further includes one or more analog to digital converters (A/D converters) that convert, for example, between an analog signal from the accelerometer(s) 144 and a digital signal to the processor 146. In some embodiments radio 150 is a Wireless Local Area Network (WLAN) radio and/or a Wireless Personal Area Network (WPAN) radio. In some embodiments, handheld device 104 includes a conventional communication protocol with public/private key exchange and a cryptographic engine (for example, implemented by processor 146). In some embodiments, handheld device 104 includes vibration comparison logic (for example, implemented by processor 146).

In some embodiments, a user approaches fixed device 102 with handheld device 104 and swipes his handheld device 102 (and/or handheld computer and/or portable device) across the pairing pad 112 (and/or across another suitable surface) of the fixed device 102 (for example, in a motion as illustrated by arrow 162 of FIG. 1). In some embodiments, this movement of the handheld device 104 across the fixed device 102 activates a contact switch that turns on a high sampling rate for accelerometers 112 and 142, which are being operated in an energy efficient manner. The handheld device 104 transmits an encrypted copy of the captured vibration profile to the fixed device 102 over a conventional wireless communication channel 170 between radios 120 and 150. The fixed device 102 also transmits an encrypted copy of its captured vibration profile to the handheld device 104 over the wireless communication channel 170. In some embodiments, a public key is packaged with each of the vibration profiles sent to the other device. The fixed device 102 and the handheld device 104 then exchange keys to establish a secure communication channel over the wireless communication channel 170, and the keys to be used to decrypt the vibration profiles may now be safely exchanged. The fixed device 102 and the handheld device 104 then compare the two vibration profiles to determine if they match. This comparison may be implemented, for example, using processor 116 and/or correlator 118, and/or using processor 146 and/or correlator 148. The comparison is performed in some embodiments using simple correlation and/or coherence techniques or using more sophisticated pattern matching techniques. If the vibration profiles match, the identities of the two devices 102 and 104 are confirmed to one another and the devices may then begin to share resources.

In some embodiments, in contrast to methods such subject to spoofing (such as using Bluetooth technology), near field communication is implemented without increased cost, space, and/or power.

Since many handheld devices have very small keyboards and displays, it is becoming more and more important to securely use nearby fixed devices such as displays, keyboards, etc. without the threat of an attacker intercepting personal information such as keystrokes and/or display information. In some embodiments, a user of such a handheld device is able to make use of a fixed device such as a display or a keyboard or some other type of fixed device in a secure manner.

In some embodiments, two physical devices (a first device and a second device) have an accelerometer firmly attached. Both devices measure a vibration profile when there is a mechanical coupling between the two devices and one or both of the two devices are in motion. In some embodiments, this mechanical coupling means that the two devices come in contact while in motion, or they both come into physical contact with a third object that couples vibration or motion between the two devices.

Figure 2:
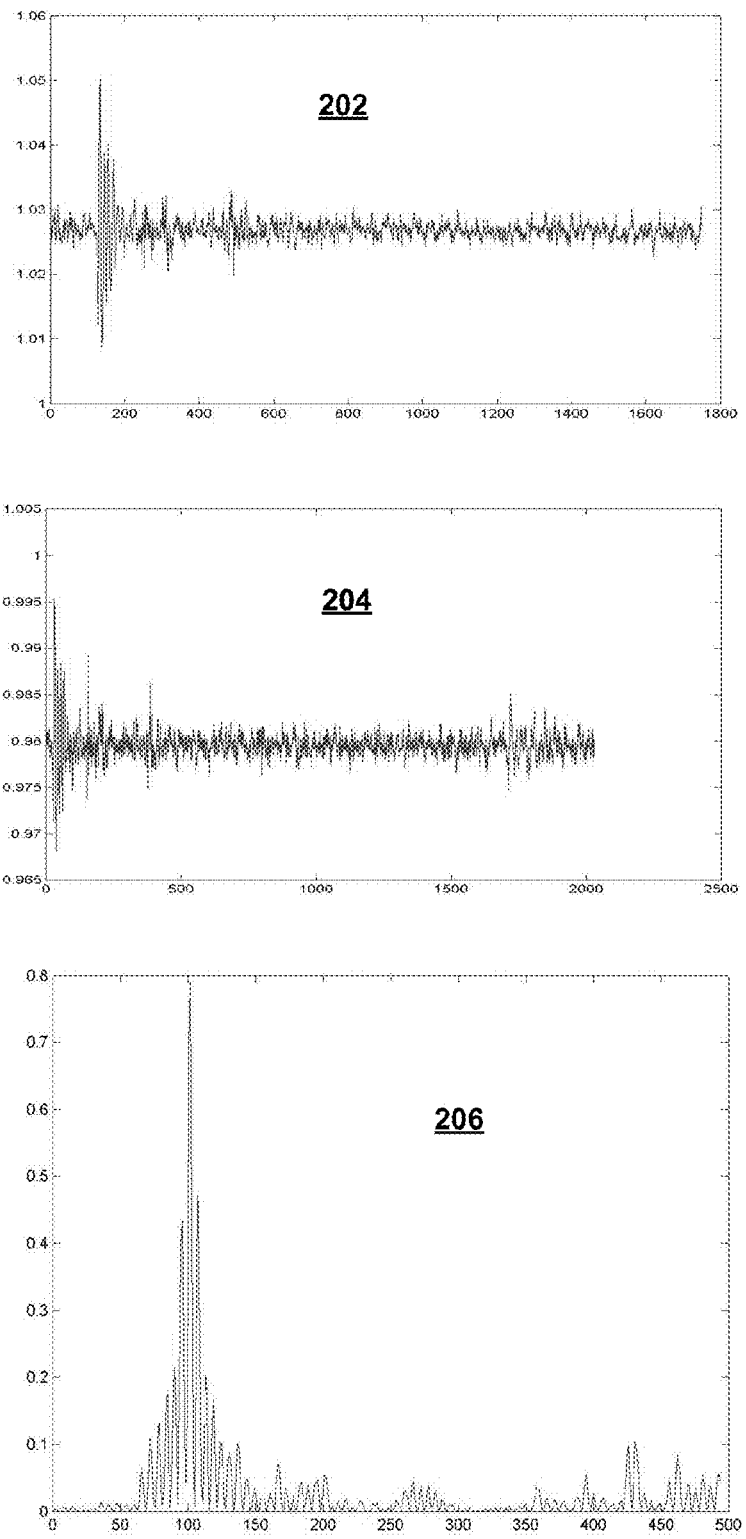
FIG. 2 illustrated diagrams according to some embodiments of the inventions.

FIG. 2 illustrates three diagrams according to some embodiments. The three diagrams of FIG. 2 include a first diagram 202, a second diagram 204, and an output diagram 206. First diagram 202 illustrates vibration profiles (for example, accelerometer signals) from a first device such as a fixed device in response to a user moving a second device such as a handheld device across a pairing pad or other surface of the first device. Second diagram 204 illustrates vibration profiles (for example, accelerometer signals) from the second device such as a fixed device in response to a user moving the second device so that the first device moves relative to a pairing pad or other surface of the second device. Output diagram 206 illustrates an output of a coherence detector combining the two signals and shows a clear match between the two vibration profiles from diagrams 202 and 204 (for example, in FIG. 2 at a delay of 100 samples).

In some embodiments, two physical elements (for example, pairing pads) on respective devices physically and/or mechanically couple with each other during a relative movement between the two devices. Both devices encrypt vibration profiles provided through accelerometers coupled to the physical elements and transmit the encrypted vibration profiles to each other. This gives each device a "secret" that only the other can verify. In some embodiments, the devices additionally encrypt a public key along with the transmitted vibration profiles. The devices are able to verify the "secret" once they are able to decrypt the vibration profile received from the other device. Then a secure channel is established between the two devices using a standard protocol (for example, in some embodiments, using Bluetooth). Once the secure channel has been established, both sides may send the keys necessary to decrypt the package containing the vibration profile (and in some embodiments, the public key). Once they have verified each other's vibration profiles, they can use public keys (for example, the public keys that were packaged with the vibration profiles) to securely communicate with each other. In this manner, the devices are guaranteed that the device that they are talking to is the one that created the vibration profile.

Although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, the interfaces that transmit and/or receive signals, etc.), and others.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Although flow diagrams and/or state diagrams may have been used herein to describe embodiments, the inventions are not limited to those diagrams or to corresponding descriptions herein. For example, flow need not move through each illustrated box or state or in exactly the same order as illustrated and described herein.

The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. An apparatus comprising:
a first device;
an accelerometer mechanically coupled to the first device to obtain a first vibration profile in response to a relative movement of the first device and a second device, wherein the relative movement comprises a swiping of a first pairing pad of the first device across a second pairing pad of the second device;
a radio to transmit an encrypted version of the first vibration profile to the second device and to securely receive an encrypted version of a second vibration profile from the second device;
a processor to set up a secure channel between the radio and the second device in which to exchange keys with the second device to decrypt the received encrypted second vibration profile, to decrypt the received encrypted second vibration profile in response to at least one of the exchanged keys, to compare the transmitted first vibration profile with the received decrypted second vibration profile using vibration comparison logic, and to allow a sharing of resources with the second device if a match occurs between the transmitted first vibration profile and the received second vibration profile.

2. The apparatus of claim 1, wherein the second device is a handheld device.

3. The apparatus of claim 1, wherein the second device is a stationary device.

4. The apparatus of claim 1, wherein the first pairing pad is configured to enable receipt of the vibration profile by the accelerometer.

5. The apparatus of claim 1, wherein the first pairing pad includes a flat surface with irregular bumps and/or ridges, and wherein the second pairing pad includes a flat surface with irregular bumps and/or ridges.

6. The apparatus of claim 1, further comprising a contact sensor to control a sampling rate of the accelerometer in response to the relative movement of the first device and the second device.

7. The apparatus of claim 1, further comprising a contact sensor to control a sampling rate of the accelerometer in response to the swiping of the first pairing pad across the second pairing pad.

8. The apparatus of claim 1, wherein the radio transmits an encryption key that is encrypted along with the vibration profile, the transmitted encryption key used for secure communication and/or sharing of resources between the first device and the second device.

9. A method comprising:
obtaining, at a first device, a first vibration profile in response to a relative mechanical movement of the first device and a second device, wherein the relative mechanical movement comprises a swiping of a first pairing pad of the first device across a second pairing pad of the second device;
transmitting an encrypted version of the first vibration profile to the second device;
receiving an encrypted version of a second vibration profile from the second device;
setting up a secure channel with the second device;
exchanging keys with the second device that are used to decrypt the encrypted second vibration profiles;
decrypting the received second encrypted vibration profile in response to at least one of the exchanged keys;
comparing the transmitted first vibration profile with the encrypted received second vibration profile using vibration comparison logic; and
allowing a sharing of resources with the second device if a match occurs between the transmitted first vibration profile and the received second vibration profile.

10. The method of claim 9, wherein the second device is a handheld device.

11. The method of claim 9, wherein the second device is a stationary device.

12. The method of claim 9, further comprising transmitting an encryption key that is encrypted along with the vibration profile, the transmitted encryption key to be used for secure communication and/or sharing of resources between the first device and the second device.

13. A system comprising:
a first device; and
a second device;
wherein the first device includes:
a first accelerometer mechanically coupled to the first device to obtain a first vibration profile in response to a relative mechanical movement of the first device and the second device, wherein the relative mechanical movement comprises a swiping of a first pairing pad of the first device across a second pairing pad of the second device;
a first radio to transmit an encrypted version of the first vibration profile to the second device and to receive an encrypted version of a second vibration profile from the second device; and
a first processor to set up a secure channel between the first radio and the second device in which to exchange keys with the second device to decrypt the received second encrypted vibration profile, to decrypt the received second encrypted vibration profile in response to at least one of the exchanged keys, to compare the transmitted first vibration profile with the received second vibration profile using vibration comparison logic and to allow a sharing of resources with the second device if a match occurs between the transmitted first vibration profile and the received second vibration profile; and wherein the second device includes:
a second accelerometer mechanically coupled to the second device to obtain the second vibration profile in response to the relative mechanical movement of the first device and the second device;
a second radio to transmit the encrypted version of the second vibration profile to the first device and to receive the encrypted version of the first vibration profile from the first device; and
a second processor to set up the secure channel between the first radio and the second radio in which to exchange keys with the first device to decrypt the received first encrypted vibration profile, to decrypt the received first encrypted vibration profile in response to at least one of the exchanged keys, to compare the transmitted second vibration profile with the received first vibration profile using vibration comparison logic, and to allow a sharing of resources with the first device if a match occurs between the transmitted second vibration profile and the received first vibration profile.

14. The system of claim 13, wherein the first device is a stationary device and the second device is a handheld device.

15. The system of claim 13, wherein the first device is a handheld device and the second device is a handheld device.

16. The system of claim 13, wherein the first pairing pad enables receipt of the first vibration profile by the first accelerometer, and wherein the second pairing pad enables receipt of the second vibration profile by the second accelerometer.

17. The system of claim 16, wherein the first pairing pad includes a flat surface with irregular bumps and/or ridges and wherein the second pairing pad includes a flat surface with irregular bumps and/or ridges.

18. The system of claim 16, wherein the first device further includes a first contact sensor to control a sampling rate of the first accelerometer in response to the swiping of the first pairing pad across the second pairing pad, and wherein the second device further includes a second contact sensor to control a sampling rate of the second accelerometer in response to the swiping of the first pairing pad across the second pairing pad.

19. The system of claim 13, wherein the first device further includes a first contact sensor to control a sampling rate of the first accelerometer in response to the relative movement of the first device and the second device, and wherein the second device further includes a second contact sensor to control a sampling rate of the second accelerometer in response to the relative movement of the first device and the second device.

20. The system of claim 13, wherein the first radio transmits a first encryption key that is encrypted with the first vibration profile, the transmitted first encryption key used for secure communication and/or sharing of resources between the first device and the second device, and wherein the second radio transmits a second encryption key that is encrypted with the second vibration profile, the transmitted second encryption key used for secure communication and/or sharing of resources between the first device and the second device.

* * * * *